United States Patent
Raev

(10) Patent No.: US 11,403,287 B2
(45) Date of Patent: Aug. 2, 2022

(54) MASTER DATA PROFILING

(71) Applicant: SAP SE, Walldorf (DE)

(72) Inventor: Dimitrij Raev, Mannheim (DE)

(73) Assignee: SAP SE, Walldorf (DE)

( * ) Notice: Subject to any disclaimer, the term of this patent is extended or adjusted under 35 U.S.C. 154(b) by 237 days.

(21) Appl. No.: 16/891,767

(22) Filed: Jun. 3, 2020

(65) Prior Publication Data

US 2021/0382880 A1 Dec. 9, 2021

(51) Int. Cl.
| | |
|---|---|
| *G06F 16/245* | (2019.01) |
| *G06F 16/248* | (2019.01) |
| *G06F 17/15* | (2006.01) |
| *G06Q 10/06* | (2012.01) |
| *G06Q 10/10* | (2012.01) |

(52) U.S. Cl.
CPC .......... *G06F 16/245* (2019.01); *G06F 16/248* (2019.01); *G06F 17/15* (2013.01); *G06Q 10/067* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 2003/0154191 A1* | 8/2003 | Fish | G06F 8/34 707/999.102 |
| 2006/0143223 A1* | 6/2006 | Ivanova | G06F 9/4493 |
| 2014/0207731 A1* | 7/2014 | Mack | G06F 16/212 707/609 |
| 2018/0032434 A1* | 2/2018 | Patel | G06F 11/2094 |
| 2019/0332294 A1 | 10/2019 | Kilari | |
| 2020/0356562 A1* | 11/2020 | Nayak | G06F 16/9024 |

OTHER PUBLICATIONS

"European Application Serial No. 21175996.4, Extended European Search Report dated Oct. 27, 2021", 11 pgs.
Abedjan, Ziawasch, et al., "Data Profiling—A Tutorial", SIGMOD, (2017), 1747-1751.
Otto, Boris, et al., "Toward a functional reference model for master data quality management", Inf Syst E-Bus Manage 10, (2012), 395-425.
Piprani, Baba, et al., "Metamodel for Master Data", OTM Workshops, LNCS 6428, (2010), 447-456.

* cited by examiner

*Primary Examiner* — Irene Baker
(74) *Attorney, Agent, or Firm* — Schwegman Lundberg & Woessner, P.A.

(57) ABSTRACT

In an example embodiment, a specialized in-memory database abstraction component is introduced in a cloud cluster. The in-memory database abstraction component may receive lifecycle commands from a client-facing application and interface with a container service to create an in-memory database resource. When parameters are received by the in-memory database abstraction component from the client-facing application, the in-memory database abstraction component may act to validate the parameters, determine if a service plan is available, and determine whether the parameters meet the service plan requirements. If the service plan requirements are not met, the in-memory database abstraction component translates the parameters for the in-memory database resource.

20 Claims, 18 Drawing Sheets

MODEL FIELD ANALYSIS FOR PRODUCTS

STANDARD

SEARCH

TABLE:

FIELD:

FIELDS (11)

ADAPT FILTERS

| TABLE | FIELD | DATA TYPE | NUMBER OF DISTINCT VOLUME | FILLED/NOT FILLED | USED IN IMPLEMENTATION OF RULES | NUMBER OF CHANGES | DEPENDENCY TO OTHER FIELDS |
|---|---|---|---|---|---|---|---|
| PLANT DATA (MARC) | MRP CONTROLLER DISPO | CHAR (3) | 83 | 31.2% / 68.8% | 13 | 27 | 34% |
| BASIC DATA (MARA) | LABORATORY/DESIGN OFFICE LABOR | CHAR (3) | 4 | 98.6% | 2 | 1 | 33% |
| BASIC DATA (MARA) | MATERIAL GROUP MATKL | CHAR (9) | 13 | 29.8% / 79.2% | 7 | 30 | 31% |
| BASIC DATA (MARA) | PRODUCT HIERARCHY PRDHA | CHAR 18) | 3 | 98.6% | 2 | 1 | 30% |
| BASIC DATA (MARA) | BASE UNIT OF MEASURE MIENS | CHAR (3) | 33 | 99.9% | 2 | 21 | 29% |
| PLANT DATA (MARC) | MRP TYPE DISMM | CHAR (2) | 6 | 99% | 5 | 12 | 27% |
| BASIC DATA (MARA) | DIVISION SPART | CHAR (2) | 5 | 85.2% | 2 | 7 | 25% |
| PLANT DATA (MARC) | LOADING GROUP LADGR | CHAR (4) | 3 | 95.6% | 0 | 5 | 21% |

802 FIELD · 804 TABLE · 806 DATA TYPE · 808 NUMBER OF · 810 SCHEDULE CALCULATION · 812 · 814 RECALCULATE · 816

FIG. 8

REPLACEMENT SHEET

UPDATED BY: DIMITRIJ RAEV

UPDATED ON: OCT 6, 2019, 8:50:30AM

DISTRIBUTION  DEPENDENCY  USEAGE IN DATA QUALITY RULES

1100

FIELD VALUES (32)

| FIELD VALUES | OCCUPANCY | N OF CHANGES FROM THIS VALUE | N OF CHANGES TO THIS VALUE |
|---|---|---|---|
| ST | 10,569 | 2 | 2 |
| M | 2,403 | 2 | 1 |
| KG | 2,333 | 10 | 15 |
| TO | 2,143 | 2 | 2 |
| EA | 840 | 1 | 1 |
| L | 353 | 6 | 6 |
| BOT | 255 | 2 | 2 |
| KAN | 247 | 1 | 1 |
| DR | 57 | 0 | 0 |
| PC | 28 | 0 | 0 |

MORE
{10/32}

*FIG. 11*

| BASIC DATA | BASE UNIT OF MEASURE | | | |
|---|---|---|---|---|
| DISTRIBUTION | DEPENDENCY | USAGE IN DATA QUALITY RULES | | |
| DEPENDENT FIELDS (10) | | | | |
| TABLE | | FIELD | | DEPENDECY INDEX |
| BASIC DATA (MARA) | | DIVISIONS (SPART) | | 0.49 > |
| PLANT DATA (MARC) | | MRP TYPE (DISMM) | | 0.45 > |
| BASIC DATA (MARA) | | PRODUCT HIERARCHY (PRDHA) | | 0.38 > |
| BASIC DATA (MARA) | | LABORATORY/DESIGN OFFICE (LABOR) | | 0.34 > |
| PLANT DATA (MARC) | | MRP CONTROLLER (DISPO) | | 0.33 > |
| BASIC DATA (MARA) | | MATERIAL TYPE (MTART) | | 0.32 > |
| PLANT DATA (MARC) | | LOADING GROUP (LADGR) | | 0.29 > |
| BASIC DATA (MARA) | | MATERIAL GROUP (MATKL) | | 0.28 > |
| WAREHOUSE STORAGE TYPE (MLGT) | | PICKING AREA (KOBER) | | 0.00 > |
| WAREHOUSE STORAGE TYPE (MLGT) | | STORAGE BIN (LGPLA) | | 0.00 > |

MASTER DATA PROFILING

TECHNICAL FIELD

This document generally relates to database technology. More specifically, this document relates to master data profiling.

BACKGROUND

Enterprise resource management (ERP) is the integrated management of main business processes. Typically it is implemented as a suite of integrated software applications that an organization can use to collect, store, manage, and interpret data from many business activities.

Master Data Management (MDM) is a technology-enabled business discipline in which business and information technology organizations work together to ensure uniformity, accuracy, stewardship, semantic consistency, and accountability of an organizations official, shared master data assets. MDM is also the method of enabling an enterprise to link all of its critical data to one file, called a master file that provides a common point of reference.

BRIEF DESCRIPTION OF DRAWINGS

The present disclosure is illustrated by way of example and not limitation in the figures of the accompanying drawings, in which like references indicate similar elements.

FIG. 8 is a screen capture illustrating a first screen of a user interface for performing master data field analysis in accordance with an example embodiment.

FIG. 11 is a screen capture illustrating a fourth screen of the user interface, in accordance with an example embodiment.

FIG. 14 is a screen capture illustrating a ninth screen of user interface, in accordance with an example embodiment.

DETAILED DESCRIPTION

Figure 1:
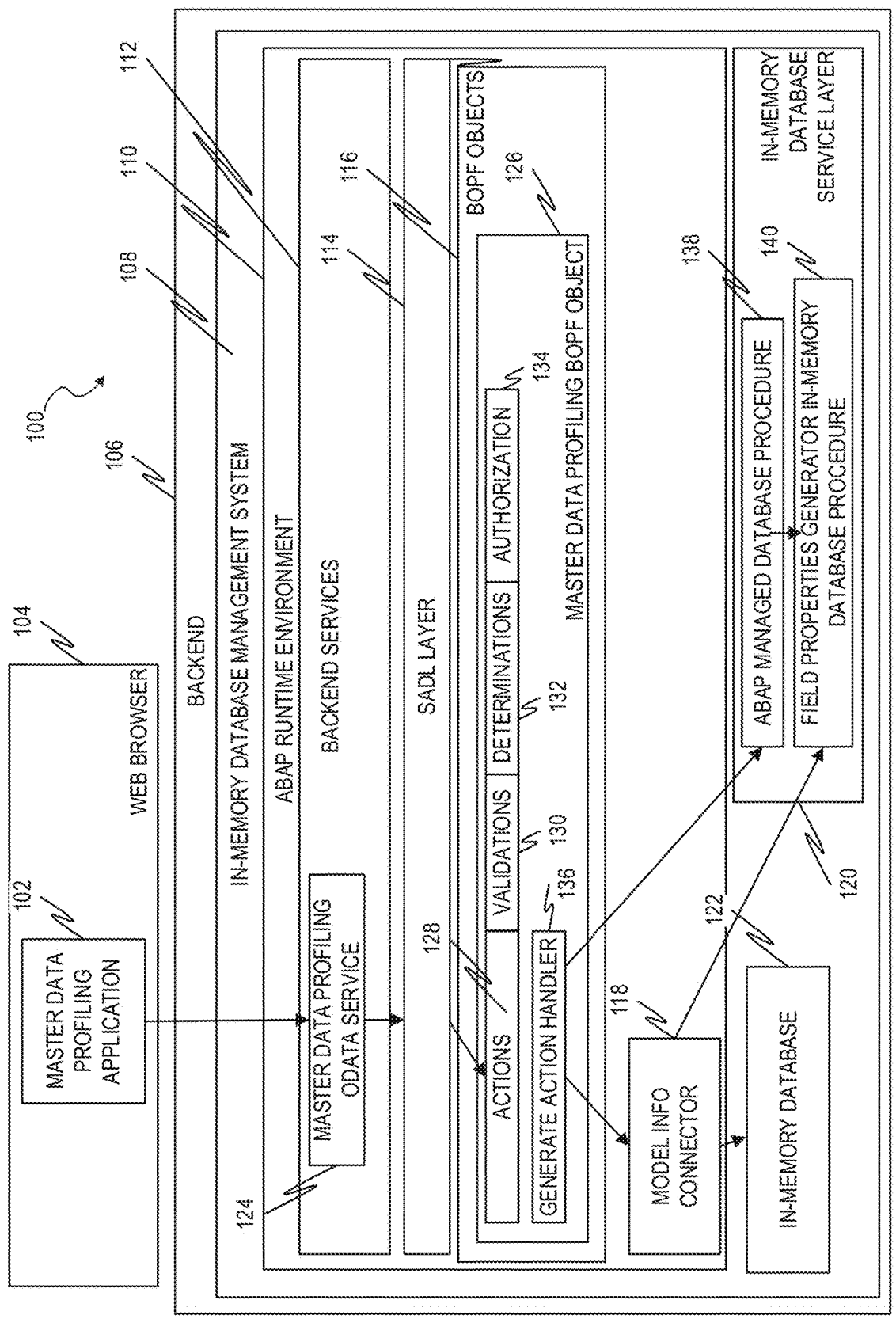
FIG. 1 is a block diagram illustrating a system for providing master data field analysis in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

A master data model is an information model of business concepts, or entities, and how they relate to each other. Each master data model may be called a domain, and in a complicated and large ERP environment there may be a lot of domains. Each domain is a relational data model with hundreds of fields having relationships to other domains. This can be incredibly complex, and it is common for only true experts know what the model looks like and which model fields are representing what. When master data records are created or changed, however, it is necessary to know the dependencies/correlations between the fields in order to correctly maintain domain entities. Because this is master data, the qualities of these records are of extreme importance to the smooth functioning of the ERP, as it impacts every record that utilizes the master data.

In order to ensure high data quality, first it is necessary to understand the data using analytics tools, obtain insights from the relationships, and then correct incorrect data or implement checks to ensure that incorrect records cannot be created. Further, the data can also reveal dependencies between fields, which can support future master data creation or change processes using, for example, suggestions or tools. Data Quality and Analytics tools, however, assume that users are experts and know what their data model looks like, including which fields are in which table and how the field values are distributed or dependent on one another. Many users, however, do not have this level of knowledge because they are not experts or do not know the whole data model due to a significant number of changes of processes and models.

In an example embodiment, an analytics tool is provided that provides to users various pieces of information about a master data model of an ERP system, including the relationship of the data model, an overview of model fields used in tables, an indication of which fields are more important than others, an indication of which fields are frequently changed, and from and to which values they are frequently changed, the distribution for each model field corresponding to the real data on the database (to learn patterns or detect outliers), the dependency of model fields between each other over different levels of a relational data model, and an indication of interesting field-value combinations in detail.

In an example embodiment, the analytics tool additionally shows integration into a central rule repository in which one implements a data quality rule. It shows if a particular field is used there as well as the implementation status of the corresponding data quality rule. If there is a usage, then the analytics tool can indicate that this field is important and is used for improving the data quality. The analytics tool also allows one to view what exactly is checked at this field and enhance the implementation from the analysis. When there is no data quality rule yet implemented for the field, but the field is frequently used or the user detects some anomalies, then a data quality rule can be implanted, which is then reflected in the analytics tool.

In an example embodiment, the analytics tool actually comprises two applications: Model Field Analysis and Master Data Record Analysis. The Model Field Analysis application can be used on each data model, i.e. it is domain model-generic. The user can provide the model fields and tables to analyze and the joins between the tables for each domain model and the application calculates the distribution of model field values, the dependency or dependencies, and the field value changed. The model field information can be extracted from model tools or also from virtual data models. The dependencies may be used to, for example, create a rule suggestion in the master data creation or change process, or prefill entries. Additionally it becomes possible to easily differentiate between certain attributes of the data that should generally be some sort of rule, or whether the attributes were just outliers. These attributes may include relationships between fields, as well as concrete field-value combinations.

In an example embodiment, for each domain model there are two application: Model Field Analysis and Model Record Analysis, which may each be implemented in one of two ways.

The first of these implementations is a business object implementation, where a business object processing framework (BOPF) is used to handle the corresponding oData requests and data of the field properties is persisted in an in-memory database. A business object is an entity within a multitier software application that works in conjunction with the data access and business logic layers to transport data. Business objects separate state from behavior because they are communicated across the tiers in a multi-tiered system, while the real work of the application is done in the business tier and does not move across the tiers.

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany.

BOPF enables actions, validations, determinations, and authorizations that are used for the master data. The generated field properties results can then be split to specific user profiles using authorization objects. This enables easy and quick access to data without regenerating it. Additionally, a scheduling mechanism to generate the field properties on a periodic basis can be used.

The second implementation is by using a real-time calculation using an Application Program Interface (API) call in conjunction with change data capture (CDC) tables. CDC is a set of software design patterns used to determine and track the data that has changed so that actions can be taken using the changed data. Whenever a request comes via the API from the oData service, the data is generated. Parameters passed with the API are utilized.

Beginning first with the first implementation, FIG. 1 is a block diagram illustrating a system 100 for providing master data field analysis in accordance with an example embodiment. A master data profiling application 102 may operate within a web browser 104. On a backend 106, an in-memory database management system 108 may operate an Advanced Business Application Programming (ABAP) runtime environment 110. The ABAP runtime environment 110 may include a backend services layer 112, a Semantic Application Design Language (SADL) layer 114, a BOPF objects layer 116, and a model information connector 118.

The in-memory database management system 108 also includes in-memory database service layer 120 and an in-memory database 122.

The backend services layer 112 includes a master data profiling oData service 124, which receives requests from the master data profiling application 102. The SADL layer 114 transforms the oData request into a Core Data Service (CDS) view call, which then gets passed to a master data profiling BOPF object 126 in the BOPF objects layer 116. CDS allows for secure storing and managing of data that is used by business applications. Data within CDS is stored within a set of entities. An entity is a set of records used to store data, similar to how a table stores data within a database. CDS includes a base set of standard entities that cover typical scenarios, but custom entities specific to organizations can also be created.

The master data profiling BOPF object 126 includes a series of actions 128, validations 130, determinations 132, and authorizations 134 that can be performed on data. A generate action handler 136 acts to generate model information and pass this model information to the model information connector 118, which sends the model information to the in-memory database 122 for persistence. The model is also sent to a field properties generator in-memory database procedure 138. The generate action handler 136 also acts to generate field properties by calling a field properties generator ABAP managed database procedure 140, whose methods are transformed into in-memory database procedures for consumption by the field properties generator in-memory database procedure 138 at runtime. Generate action handler 136 also acts to generate business object instances using the generated model information and the generated field properties, and the business object is persisted in the in-memory database 122.

Figure 2:
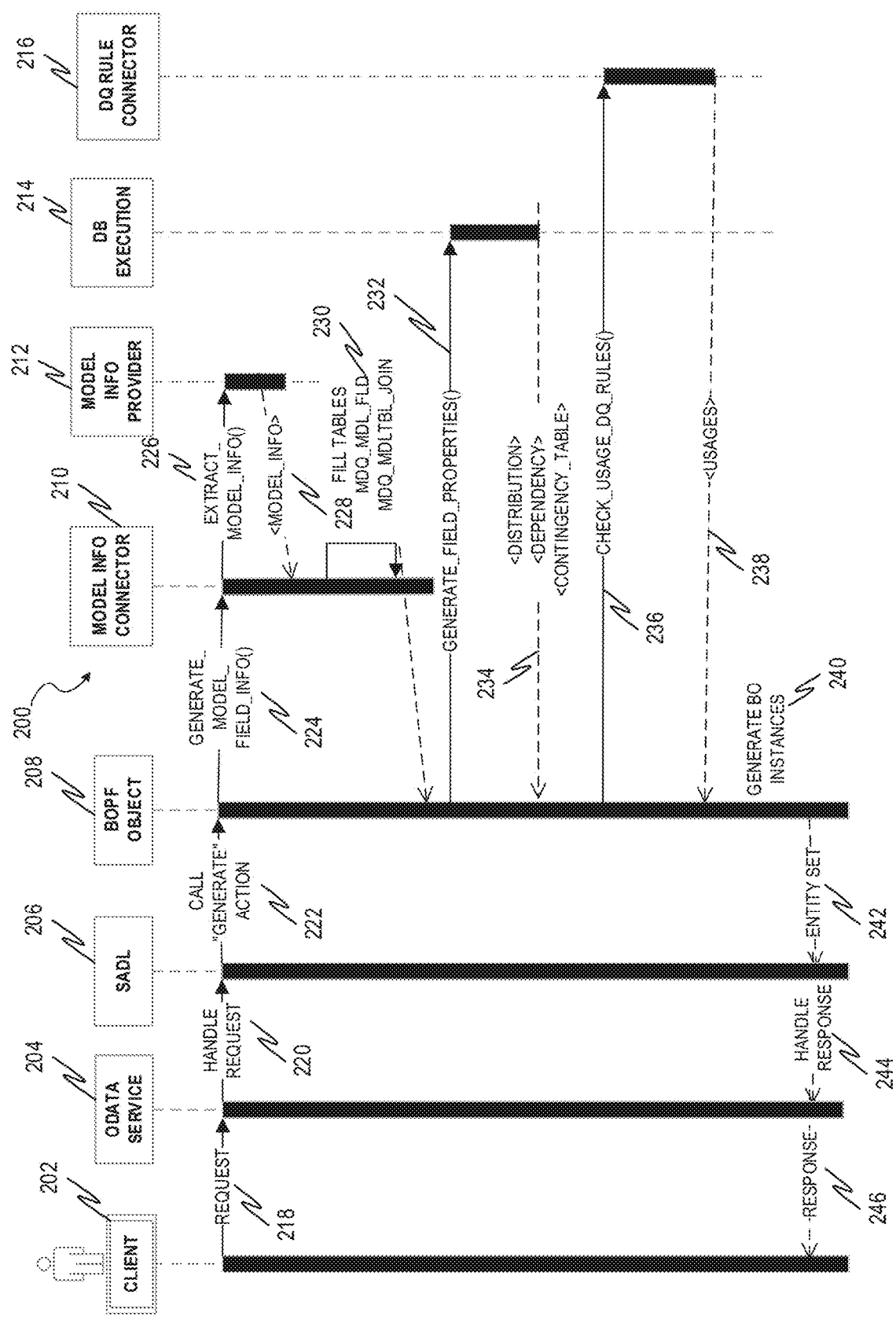
FIG. 2 is a sequence diagram illustrating a method for providing master data field analysis in accordance with an example embodiment.

FIG. 2 is a sequence diagram illustrating a method 200 for providing master data field analysis in accordance with an example embodiment. The entities involved in the method 200 include a client 202, oData Service 204, SADL 206, BOPF Object 208, Model Info Connector 210, Model Info Provider 212, Database Execution 214, and Data Quality Rule Connector 216. At operation 218, the client 202 makes a request of the oData Service 204, which at operation 220 asks the SADL 206 to handle the request. At operation 222, the SADL 206 calls a generate action commend to the BOPF Object 208, which calls the function generate_model_field_info( ) on the Model Info Connector 210 at operation 224. At operation 226, the Model Info Connector 210 calls the function extract_model_info to the Model Info Provider 212, which returns model info at operation 228. The Model Info Connector 210 then fills two tables with the model info, mdq_mdl_fld and mdq_mdtbl_join at operation 230.

At operation 232, the BOPF Object 208 calls the function generate_field_properties, which is executed by the Database Execution 214, which then returns a distribution, dependency, and contingency table at operation 234. At operation 236, the BOPF Object calls the function check_usage_dq_rule to the Data Quality Rule Connector 216, which at operation 238 returns usages. At operation 240, the BOPF Object 208 generates business object instances and then at operation 242, returns an entity set to the SADL 206. At operation 244, the SADL 206 handles the response to the oData Service 204, which at operation 246 sends a response to the client 202.

Figure 3:
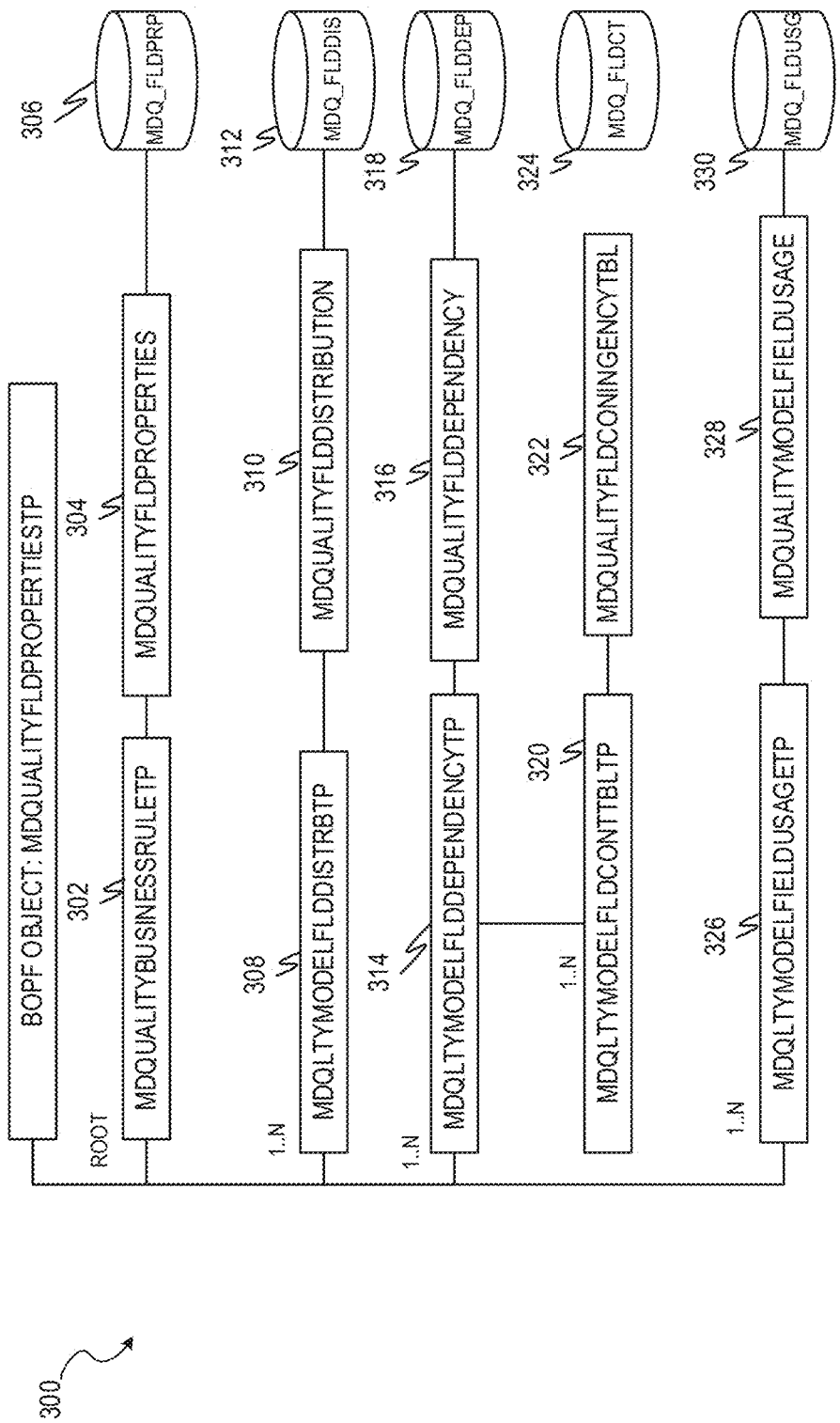
FIG. 3 is a block diagram illustrating a design of a business object in accordance with an example embodiment.

FIG. 3 is a block diagram illustrating a design 300 of a business object in accordance with an example embodiment. A root contains a master data quality business rule type 302, which includes master data quality model field properties 304 stored in data store mdq_fdlprp 306. A master data quality model field distribution type 308 includes master data quality model field distribution information 310 stored in data store mdq_flddis 312.

A master data quality model field dependency type 314 includes master data quality model field dependency information 316 stored in data store mdq_flddep 318. A master data quality model field contingency table type 320 includes master data quality model field contingency table 322 stored in data store mdq_fldct 324. A master data quality model field usage type 326 contains master data quality model field usage information 328 stored in data store mdq_fldusg 330.

Figure 4:
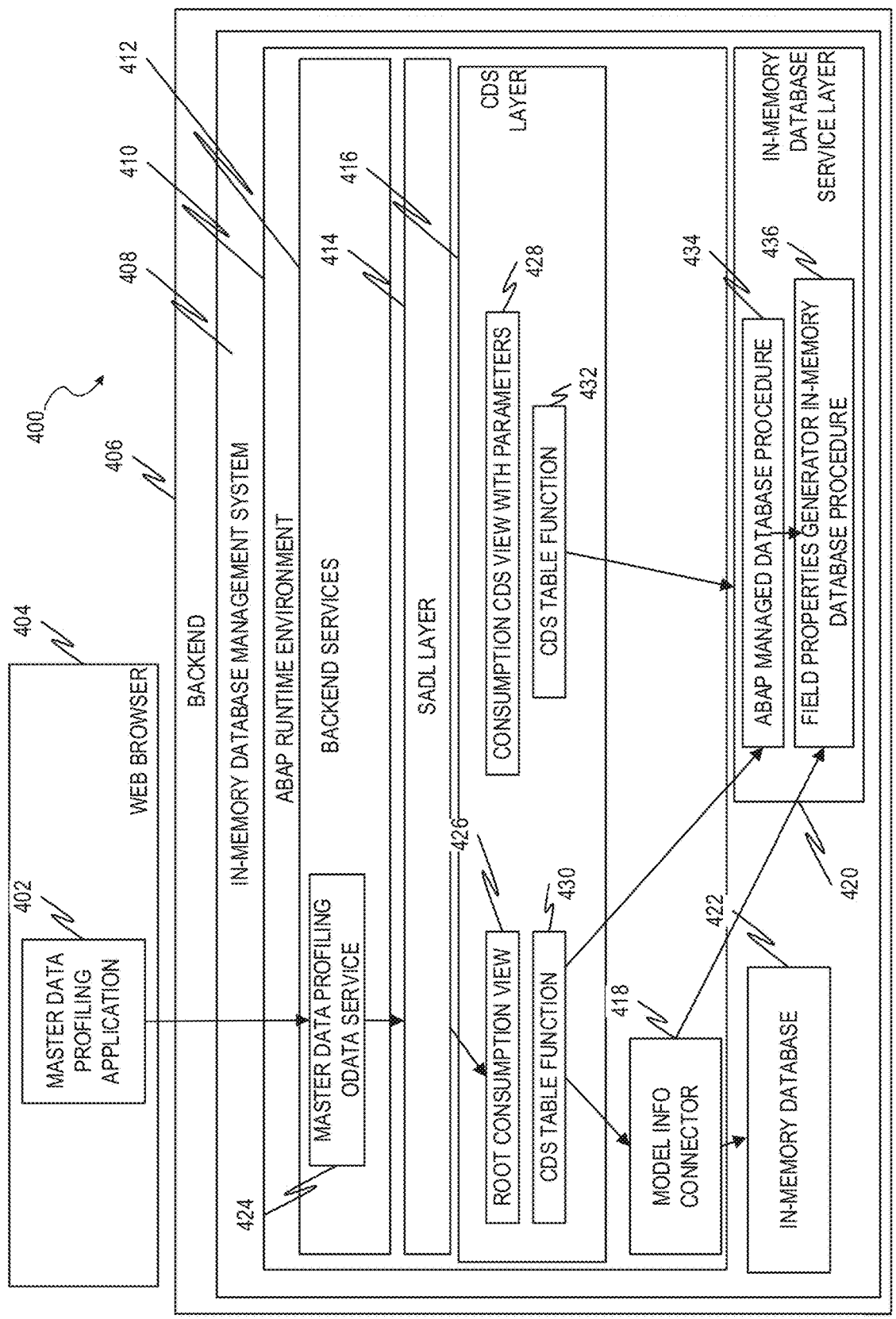
FIG. 4 is a block diagram illustrating a system for providing master data field analysis in accordance with an example embodiment.

Moving now to the second implementation, FIG. 4 is a block diagram illustrating a system 400 for providing master data field analysis in accordance with an example embodiment. A master data profiling application 402 may operate within a web browser 404. On a backend 406, an in-memory database management system 408 may operate an ABAP runtime environment 410. The ABAP runtime environment 410 may include a backend services layer 412, a SADL layer 414, a CDS layer 416, and a model information connector 418.

The in-memory database management system 408 also includes in-memory database service layer 420 and an in-memory database 422.

The backend services layer 412 includes a master data profiling oData service 424, which receives requests from the master data profiling application 402. The SADL layer 414 transforms the oData request into a CDS view call, which then gets passed to either a root consumption view 426 or a consumption CDS view with parameters 428 in the CDS layer 416. Both the root consumption view 426 and the consumption CDS view with parameters 428 include corresponding CDS table functions 430, 432.

The CDS table is sent by the CDS layer 416 to a field properties generator ABAP managed database procedure 434, whose methods are transformed into in-memory database procedures 436 at runtime. The model info, as well as the active master data persistency, are persisted in the in-memory database 422.

Figure 5A:
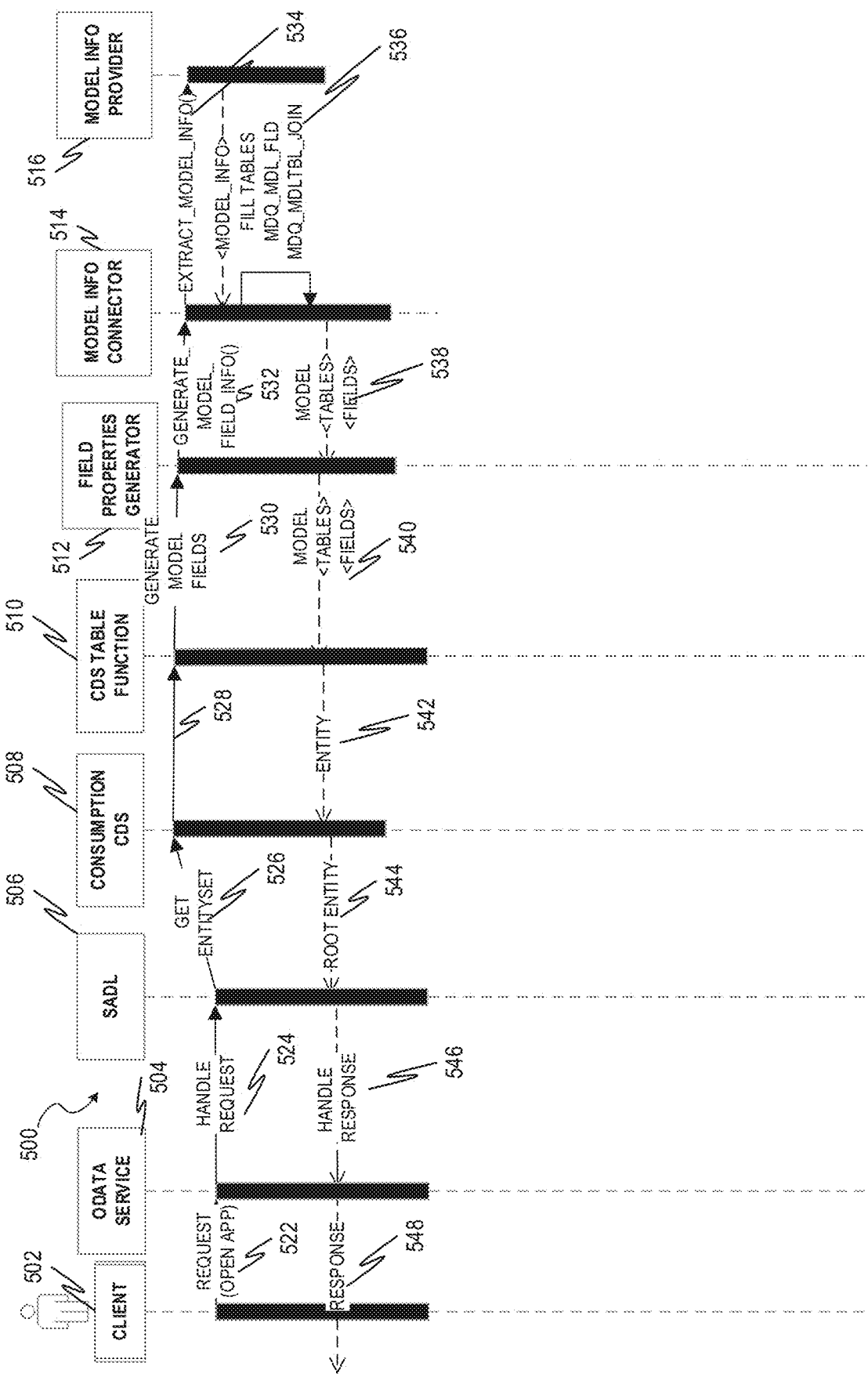
FIGS. 5A and 5B are sequence diagrams illustrating a method for providing master data field analysis in accordance with another example embodiment.
Figure 5B:
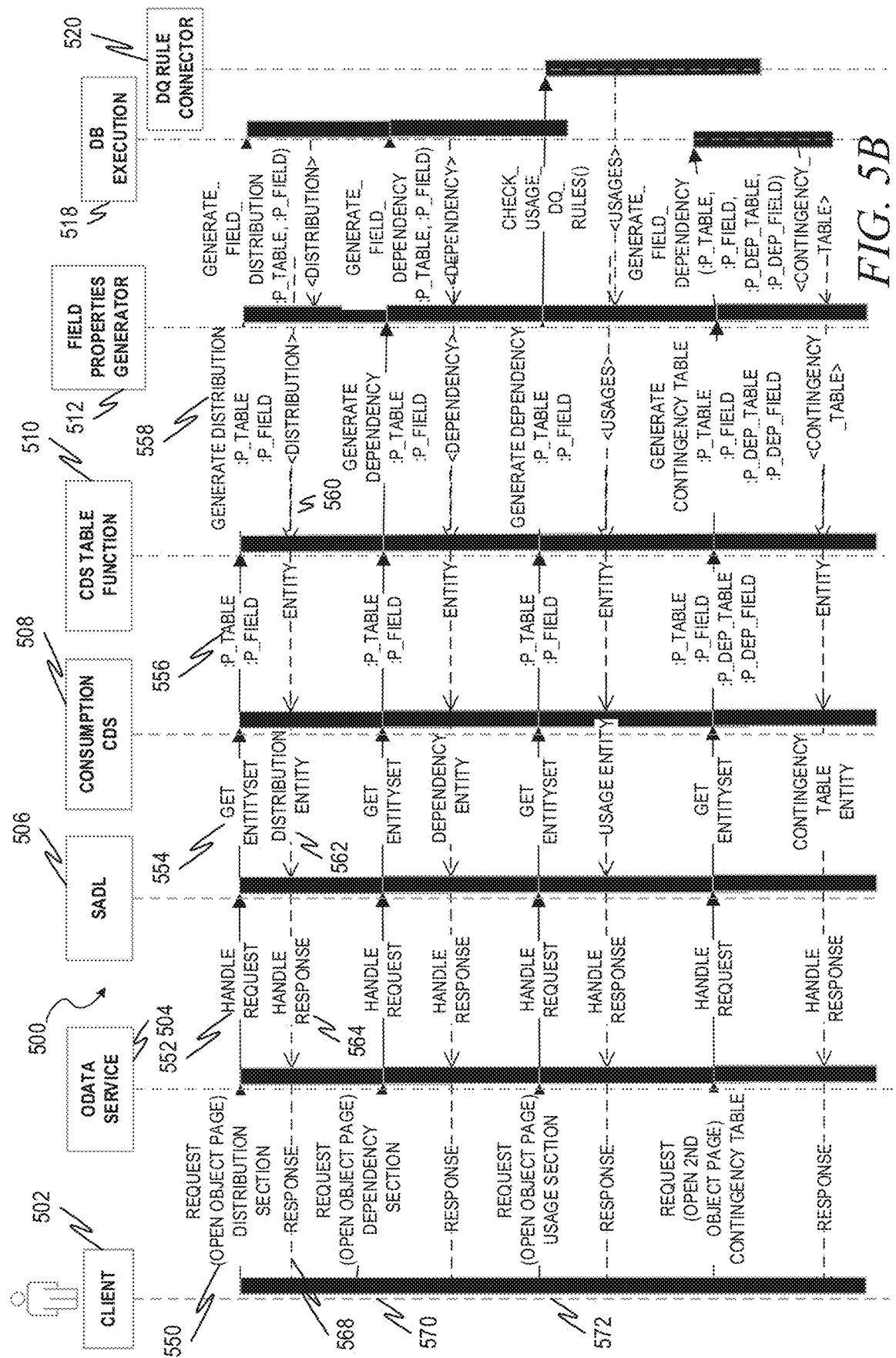

FIGS. 5A and 5B are sequence diagrams illustrating a method 500 for providing master data field analysis in accordance with another example embodiment. Referring first to FIG. 5A, the entities involved in the method 500 include a client 502, oData Service 504, SADL 506, Consumption CDS 508, CDS Table Function 510, Field Properties Generator 512, Model Info Connector 514 and Model Info Provider 516.

At operation 522, the client 502 makes a request of the oData Service 504 to open the application, which at operation 524 asks the SADL 506 to handle the request. At operation 526, the SADL 506 calls get entity set action on the consumption CDS 508, which generates an action on the CDS table function 510 at 528, which itself then generates model fields to the field properties generator 512 at operation 530. The field properties generator then calls the function generate_model_field_info on the Model Info Connector 514 at operation 532. The Model Info Connector 514 then extracts model information from the Model Info Provider 516 at operation 534. At operation 536, the Model Info Connector fills the tables mdq_mdl_fld and mdq_mdltbl_join. The model is then passed to the field properties generator 512 at operation 538, which passes it to the CDS table function 510 at operation 540, which then sends an entity to consumption CDS 508 at operation 542, which then sends the root entity to the SADL 506 at operation 544. The SADL 506 then handles the response and sends it to the oData Service 504 at operation 546, which sends the response to the client 502 at operation 548.

Referring now to FIG. 5B, the entities involved in the method 500 include a client 502, oData Service 504, SADL 506, Consumption CDS 508, CDS Table Function 510, Field Properties Generator 512, Database Execution 518, and Data Quality Rule Connector 520. When the client 502 requests to open a distribution section object page at operation 550, the oData Service 504 handles the request to the SADL 506 at operation 552, which calls a get entity set command to the Consumption CDS 508 at operation 554. At operation 556 the consumption CDS 508 sends a table and field to the CDS table function 510. The CDS table function 510 then, at operation 558, causes the Field Properties Generator 512 to generate a field distribution for the provided table and field at the database execution 518. The distribution is returned to the CDS Table Function 510 at operation 560. The Consumption CDS 508 sends a distribution entity to the SADL 506 at operation 562. The SADL 506 then handles the response and sends it to the oData Service 504 at operation 564, which sends the response to the client 502 at operation 566.

A similar process can be used to generate a field dependency, as depicted at reference number 568, and a contingency table, as depicted at reference number 570. A slightly modified process can be used to generate a usage section, as depicted at reference number 572. Specifically, the check usage data quality rules command can be sent to the Data Quality Rule Connector 520 rather than to the database execution 518.

Turning now to the generation of model information, in master data governance a master data consolidation (MDC) model can be used where a complete master data domain model is maintained. This MDC model may have adapters to extract model information such as info provider and data provider. In an example embodiment, these adapters are used to extract additional model information such as tables, fields, type, and table relationships and so on for a join statement. In an alternative embodiment, once could use a virtual data model.

Figure 6:
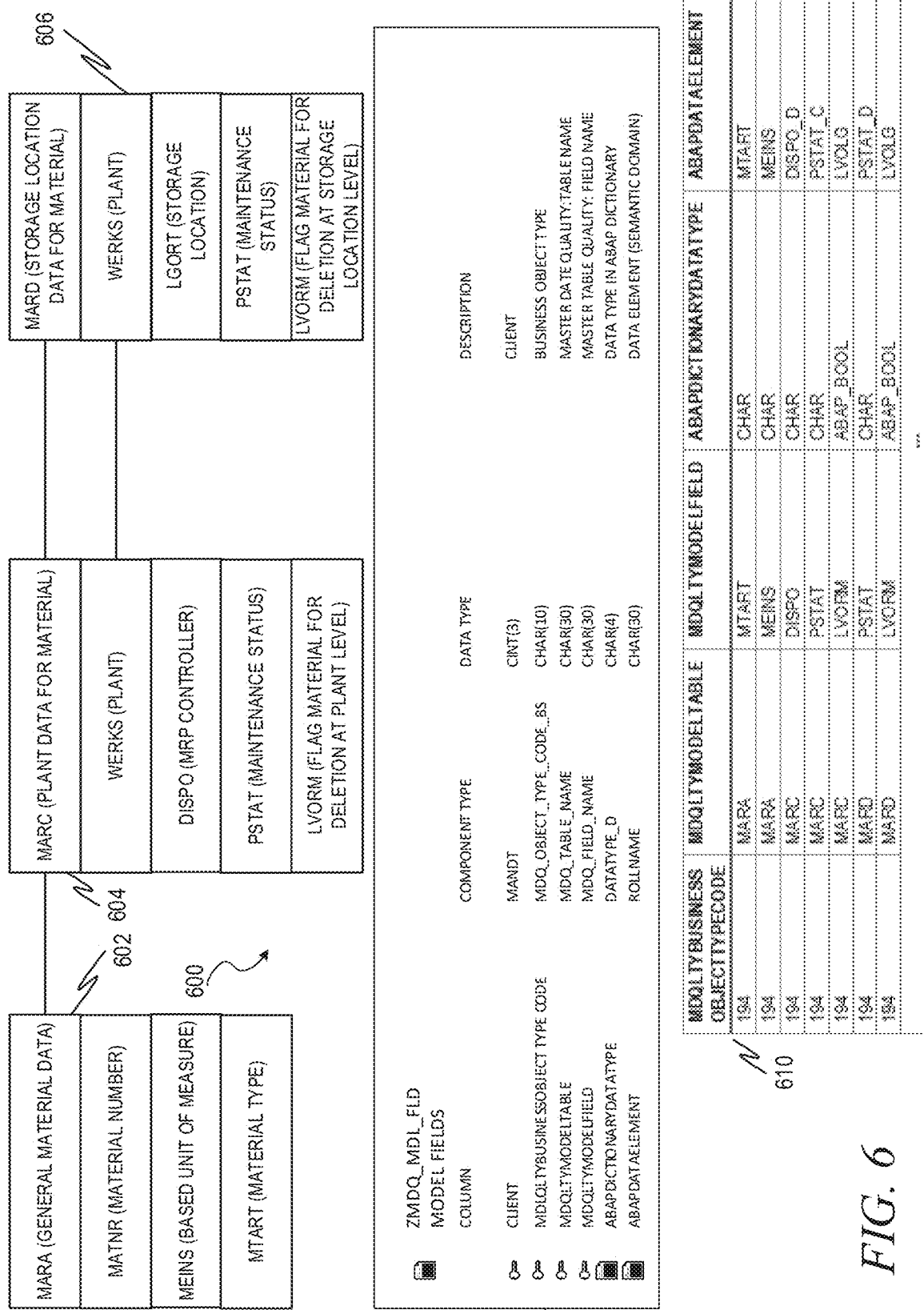
FIG. 6 is a diagram illustrating an example table design, in accordance with an example embodiment.

Turning now to the generate field properties algorithm, FIG. 6 is a diagram illustrating an example table design 600, in accordance with an example embodiment. Specifically, there are three tables, labeled MARA 602, MARC 604, and MARD 606. Here it can be seen that fields with the same name, such as PSTAT, may exist in the different tables and also have different types and values. Therefore, data profiling becomes important to keep semantically identical fields consistent over tables and hierarchies. The model info provider automatically fills in the table zmdq_mdl_fld 608 and the table join table zmdq_mdltbl_join 610 using information from the three tables: MARA 602, MARC 604, MARD 606. This can be performed either in one AMDP method or in separate AMDP methods (one for each table).

Turning now to calculating a distribution, for each field in the table mdq_mdl_fild, the distribution is calculated. The following is a sample SQL coding for field MTART from the table MARA:

```
SELECT
    'MARA' AS "TABLE_NAME",
    'MTART' AS "FIELD_NAME",
    "MTART" AS "FIELD_VALUE",
    COUNT("MTART") AS "FIELD_VALUE_COUNT"
FROM "MARA" AS MARA
INNER JOIN "MARC" as MARC
ON "MARA"."MATNR" = "MARC"."MATNR"
GROUP BY "MTART"
```

The result is a listing of table field names/values and their corresponding counts.

Turning now to calculating a contingency table, the following is a sample SQL coding for column MTART and DISPO:

```
SELECT
    'MARA' AS "TABLE_NAME",
    'MTART' AS "FIELD_NAME",
    'MARC' AS "DEP_TABLE_NAME",
    'DISPO' AS "DEP_FIELD_NAME",
    "MTART" AS "FIELD_VALUE",
    "DISPO" AS "DEP_FIELD_VALUE",
    COUNT("MTART" || "DISPO") AS "FIELD_VALUE_COUNT"
FROM "MARA" AS "MARA"
INNER JOIN "MARC" as "MARC"
ON "MARA"."MATNR" = "MARC"."MATNR"
GROUP BY "MTART", "DISPO"
ORDER BY "FIELD_VALUE_COUNT" DESC
```

As to calculating the dependency/correlation/association, in an example embodiment, a Cramer's V and ChiSquare are used in this calculation. Specifically:

Let a sample of size n of the simultaneously distributed variables A and B for $i=1, \ldots, r; j=1, \ldots, k$ be given by the frequencies $n_{ij}$=number of times the values $(A_i, B_j)$ were observed. The chi-squared statistic then is:

$$x^2 = \sum_{i,j} \frac{\left(n_{ij} - \frac{n_i, n_j}{n}\right)^2}{\frac{n_i, n_j}{n}}$$

Cramer's V is computed by taking the square root of the chi-squared statistic divided by the sample size and the minimum dimension minus 1:V=

$$\sqrt{\frac{\varphi^2}{\min(k-1, r-1)}} = \sqrt{\frac{x^2/n}{\min(k-1, r-1)}}$$

where:
$\varphi$ is the phi coefficient.
$x^2$ is derived from Pearson's chi-squared test
n is the grand total of observations and
k being the number of columns.
r being the number of rows.

From the calculated values on the contingency table, the above formulas may be used to calculate ChiSquare and Cramer's V. The resultant structure of the dependency is as follows. Let lt_contingency_table be the above calculation of the contingency table from the data quality perspective dependency is only interesting when values are maintained. Hence, initial values may be removed:

```
lt_contingency_table = SELECT "FIELD_VALUE",
        "DEP_FIELD_VALUE",
        "FIELD_VALUE_COUNT"
    FROM :lt_contingency_table
    WHERE "FIELD_VALUE" IS NOT NULL
        OR "DEP_FIELD_VALUE" IS NOT NULL;
```

Next, the count n, k, and r can be precalculated:

```
SELECT
        SUM( "FIELD_VALUE_COUNT" )
INTO n_count_all_field_values
FROM :lt_contingency_table;
SELECT
        COUNT( DISTINCT( "FIELD_VALUE" ) )
INTO n_nof_field_values
FROM :lt_contingency_table;
SELECT
        COUNT ( DISTINCT( "DEP_FIELD_VALUE" ) )
INTO n_nof_dep_field_values
FROM :lt_contingency_table;
Then,
lt_fraction =
    SELECT
            "FIELD_VALUE",
            "DEP_FIELD_VALUE",
"FIELD_VALUES"."COUNT"*"DEP_FIELD_VALUES"."COUNT"/:n_count_all_
field_values AS "FRACTION"
        FROM
            ( SELECT
                "FIELD_VALUE",
                SUM( "FIELD_VALUE_COUNT" ) AS "COUNT"
            FROM :lt_contingency_table
            GROUP BY "FIELD_VALUE" ) AS "FIELD_VALUES"
            CROSS JOIN
            ( SELECT
                "DEP_FIELD_VALUE",
                SUM( "FIELD_VALUE_COUNT" ) AS "COUNT"
            FROM :lt_contingency_table
            GROUP BY "DEP_FIELD_VALUE") AS "DEP_FIELD_VALUES";
SELECT
SUM( ("FIELD_VALUE_COUNT" - "FRACTION")
        * ("FIELD_VALUE_COUNT" - "FRACTION")
        / "FRACTION" )
```

```
INTO chi2
FROM :lt_contingency_table AS "FIELD_VALUE_COUNTS"
INNER JOIN :lt_fraction AS "FRACTION"
ON
        "FIELD_VALUE_COUNTS"."FIELD_VALUE" =
"FRACTION"."FIELD_VALUE"
AND
"FIELD_VALUE_COUNTS"."DEP_FIELD_VALUE"="FRACTION"."DEP_FIEL
D_VALUE";
cramer = SQRT( :chi2
                    / :n_count_all_field_values
                    / least( :n_nof_field_values - 1, :n_nof_dep_field_values - 1));
```

As such, there is no loop needed and the calculation is efficiently performed directly on the database. The resultant structure of the dependency looks like:

| ty_field_dependency | |
|---|---|
| table_name | type_mdw_table_name |
| field_name | type mdq_field_name |
| dep_table_name | type mdq_table_name |
| dep_field_name | type mdq_field_name |
| chi2 | type float |
| cramer | type float |

Due to legal or technical reasons, applications may write change documents, where they document any changes to master data, tables, documents, etc. For example, all changes made to an article master are automatically written to change documents. The application saves all the changes that are made to an article master record in one step to the same change document. Changes made sequentially and at different times may be written to different change documents.

For each master data object, the change objects may be written into the databases CDHDR and CDPOS. Analysis can be performed in real-time using the above-mentioned CDS view design on these databases in order to obtain the changes of a respective master data field. This data can be very important to analyze the lifecycle of a master data field and also can be used to detect error causes, such as the maintenance of a field from the object creation or the field is changed very frequently.

In an example embodiment, the CDS calls described above utilize code pushdown techniques of ABAP, which allows for added leverage of in-memory database capabilities. In the code pushdown techniques, all calculations are performed on the database later instead of the application layer, which results in fast retrieval of data and less application execution.

ADAP Managed Database Procedures (AMDP) is a class-based framework for managing and calling stored procedures as AMDP procedures in ABAP. AMDP supports database functions with a tabular return value. In order to create a CDS table function, one may first define it in a CDS source code and then implement it in an AMDP method with a return value. The code within the AMDP method is pushed to the database layer and executed within the database. This reduces the number of data transfers and the amount of transferred data between servers, such as between an AMDP server and an in-memory database server.

Figure 7:
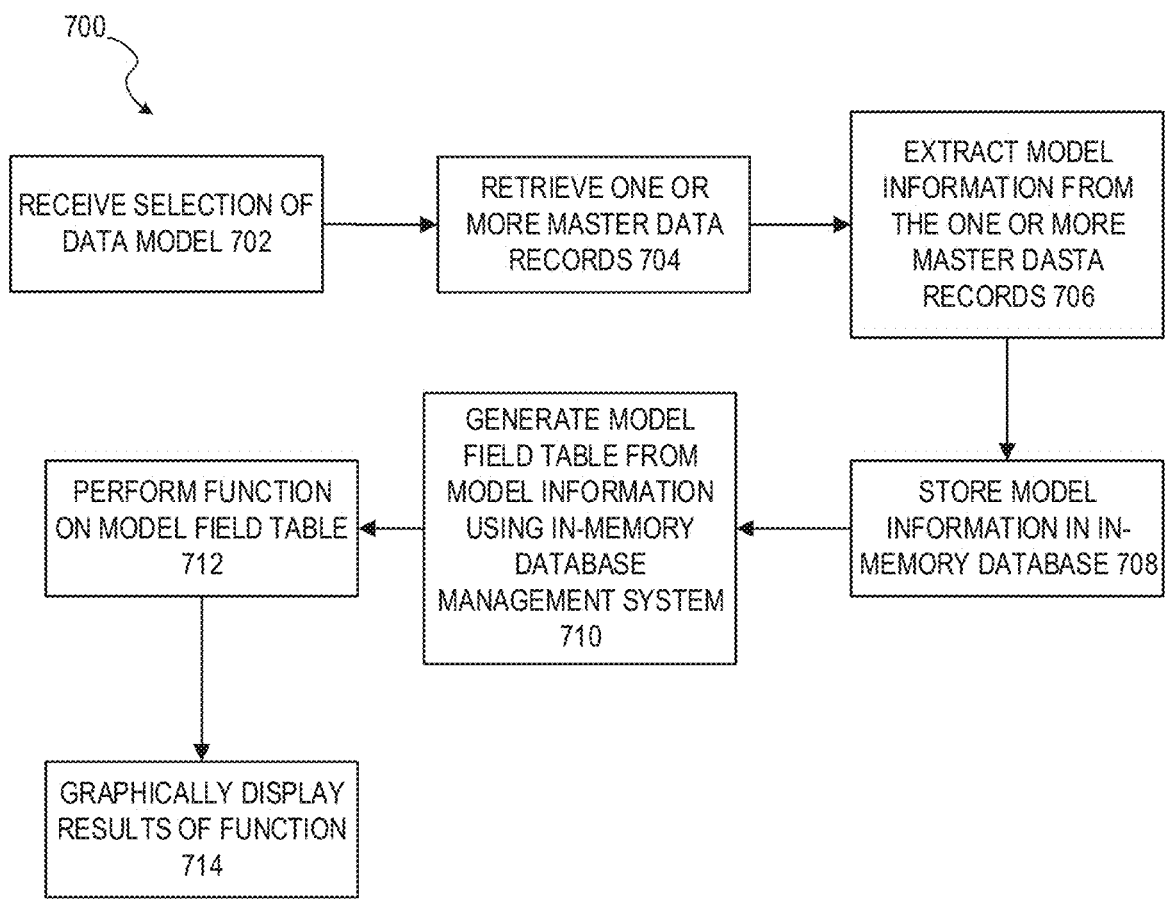
FIG. 7 is a flow diagram illustrating a method in accordance with an example embodiment.

FIG. 7 is a flow diagram illustrating a method 700 in accordance with an example embodiment. At operation 702, a selection of a data model is received via a graphical user interface. The data model uniquely corresponds to a domain of an enterprise resource processing (ERP) system. At operation 704, one or more master data records corresponding to the selected data model are retrieved. At operation 706, model information is extracted from the one or more master data records. The model information includes one or more tables, the tables each having one or more fields, each field having a data type and a description, at least one of the fields in one of the tables being dependent upon a field in another of the tables. At operation 708, the model information is stored in an in-memory database. At operation 710, using an in-memory database management system of the in-memory database, a model field table is generated from the model information. The model field table contains a first column corresponding to table identifications, a second column corresponding to field identifications, and a third column corresponding to field types. At operation 712, a function is performed on the model field table in response to receiving, via the graphical user interface, a selection of a request to perform the function on the model field table. At operation 714, results of the function are graphically displayed in the graphical user interface.

FIG. 8 is a screen capture illustrating a first screen of a user interface 800 for performing master data field analysis in accordance with an example embodiment. The screen is tabular with a table column 802, a field column 804, a data type column 806, a number of distinct values column 808, a filled/not filled column 810, a used in implementation of rules column 812, a number of changes column 814, and a dependency to other fields column 816. In any particular row, the table column 802 identifies the table having the field in the field column 804. The data type column 806 identifies the data type of the field, while the number of distinct values column 808 indicates the number of distinct values for the field in the data. The filled/not filled column 810 graphically indicates what percentage of instances of the field are filled and not filled. The used in implementation of rules column 812 indicates how many times the field has been used in an implementation of a rule. The number of changes column 814 indicates the number of changes for the field value, while the dependency to other fields column 816 graphically indicates what percentage of the instances of the field have a dependency to other fields.

Figure 9:
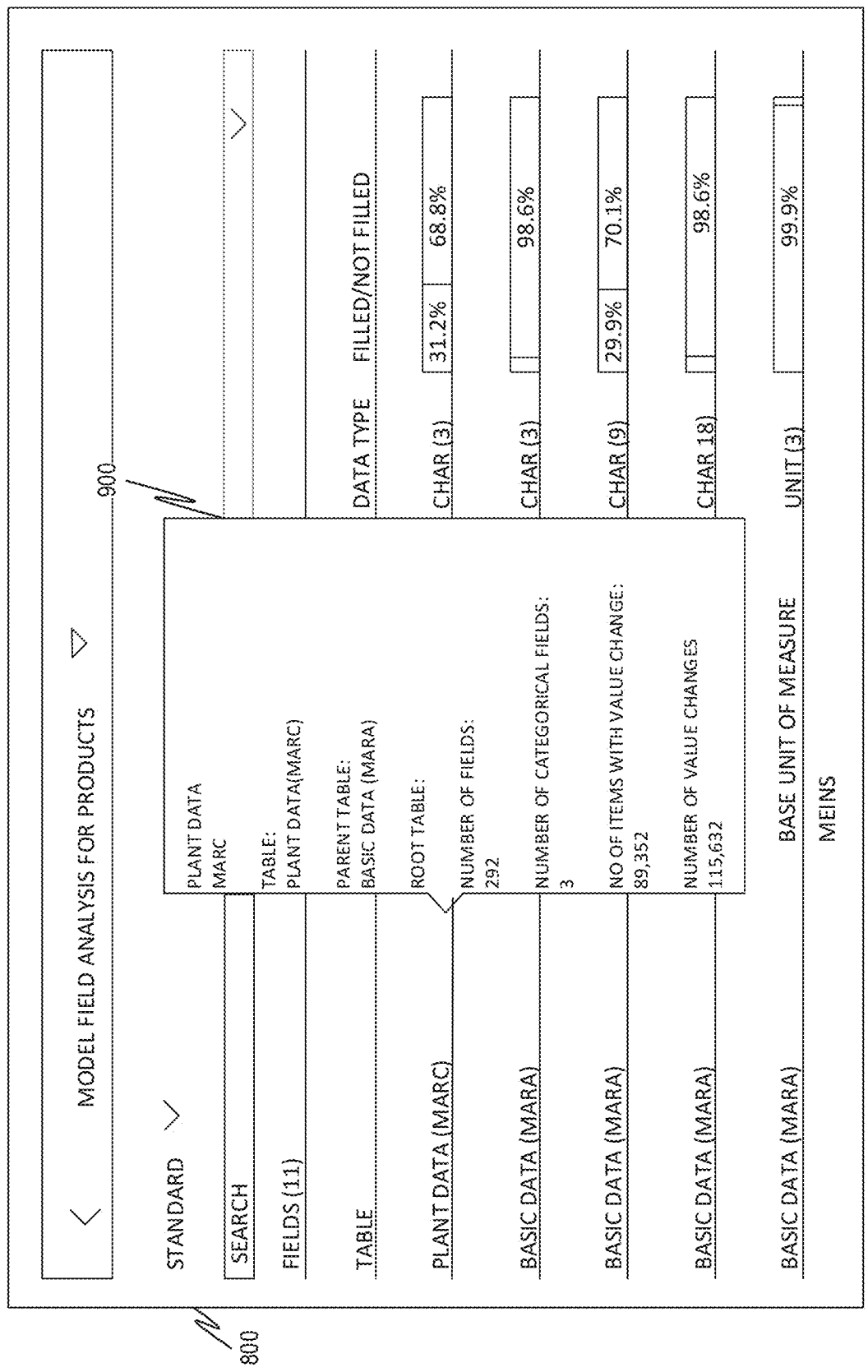
FIG. 9 is a screen capture illustrating a second screen of the user interface in accordance with an example embodiment.

Hovering over one of the tables in the table column 802 opens a quick view with table information. Hovering over one of the fields in the field column 804 causes an overlay window to pop up with a description of the field and its semantic meaning. FIG. 9 is a screen capture illustrating a second screen of the user interface 800 in accordance with an example embodiment. Here, pop-up window 900 indicates various other pieces of information about the field.

Figure 10:
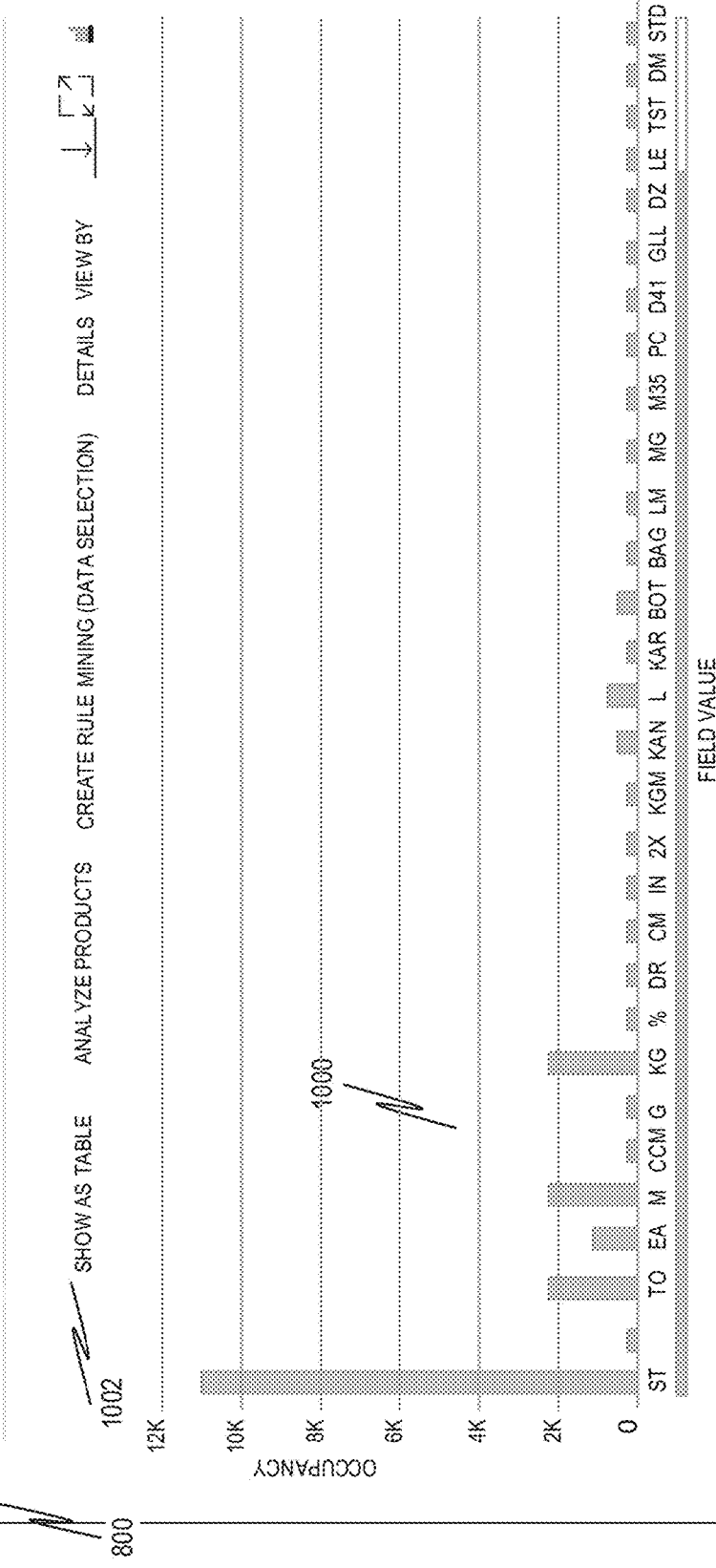
FIG. 10 is a screen capture illustrating a third screen of the user interface, in accordance with an example embodiment.

FIG. 10 is a screen capture illustrating a third screen of the user interface 800, in accordance with an example embodiment. This is an object page which comprises sections containing more detailed information of a selected line item.

Here a distribution chart 1000 shows the distribution of various values for the field and their occurrence counts in the data. A user can switch in in the distribution section between a table and a chart view, such as by selecting "show as table" 1002.

FIG. 11 is a screen capture illustrating a fourth screen of the user interface 800, in accordance with an example embodiment. Here, a distribution table 1100 is depicted, showing the occurrence counts for various field values for the field, as well as the number of changes from and to the corresponding value.

Figure 12:
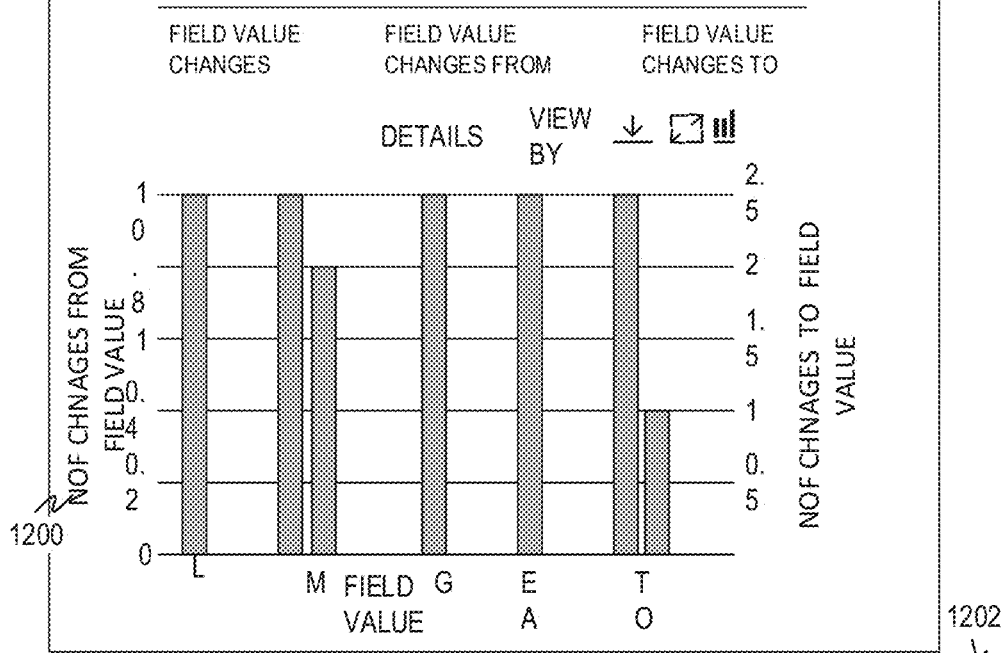
FIG. 12 is a screen capture illustrating a fifth, sixth, and seventh screen of the user interface, in accordance with an example embodiment.

FIG. 12 is a screen capture illustrating a fifth, sixth, and seventh screen of the user interface 800, in accordance with an example embodiment. Here, a chart 1200, table 1202, and table 1204 are depicted, showing additional distribution information about a field. The chart 1200 visually depicts field value changes. Table 1202 depicts field value changes from, while table 1204 depicts field value changes to. Using the chart 1200, a user can select one or more items in the chart and use selection actions. In the table 1202 or table 1204, the user can select on one line item and will be navigated to a more detailed object page of the selected item.

Figure 13:
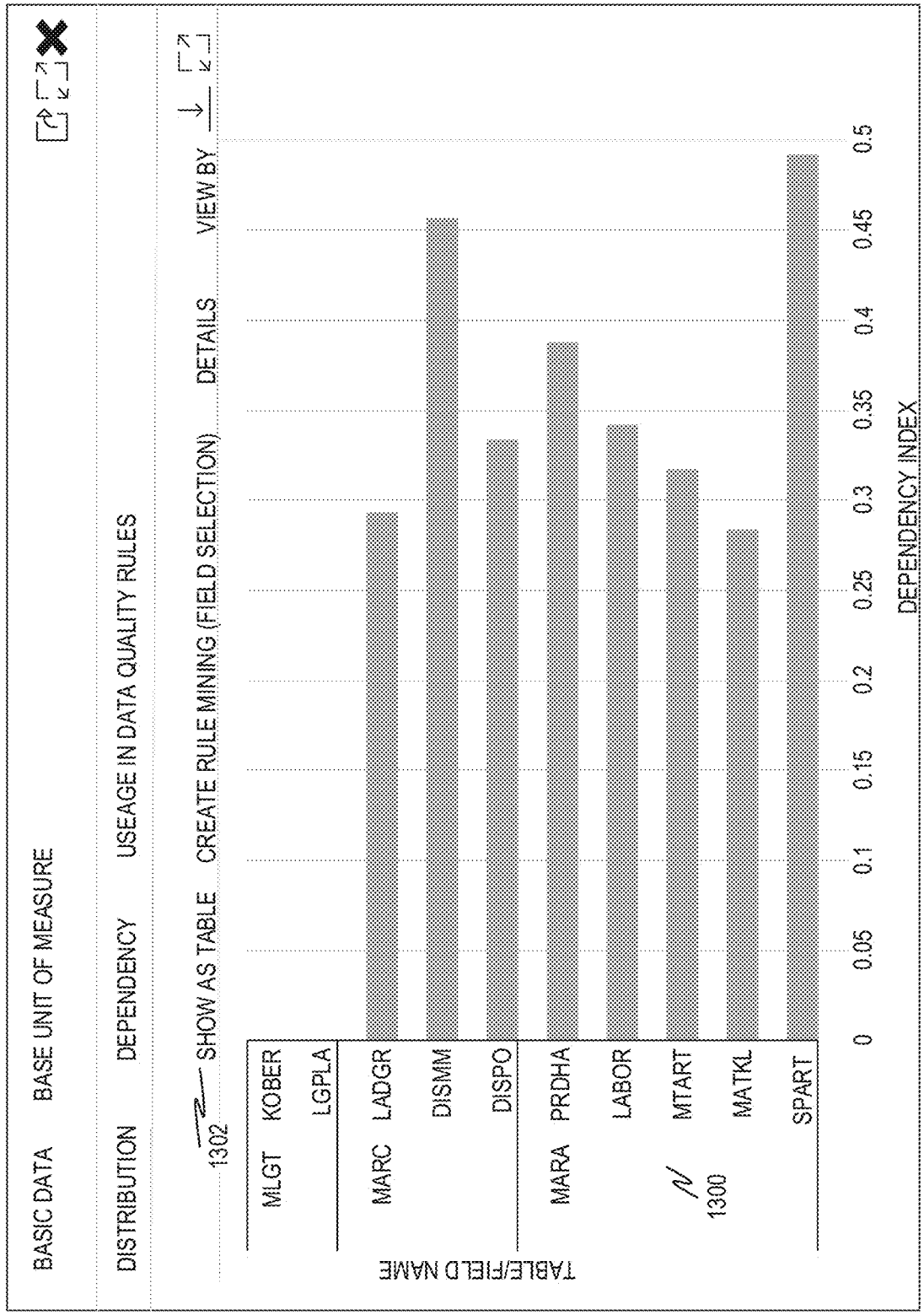
FIG. 13 is a screen capture illustrating an eighth screen of user interface, in accordance with an example embodiment.

FIG. 13 is a screen capture illustrating an eighth screen of user interface 800, in accordance with an example embodiment. Here, a dependency chart 1300 visually depicts dependencies between fields. A user can switch in the distribution section between a table and chart view by, for example, selecting "show as table" 1302.

FIG. 14 is a screen capture illustrating a ninth screen of user interface 800, in accordance with an example embodiment. Here, a dependency table 1400 visually depicts dependencies between fields.

Figure 15:
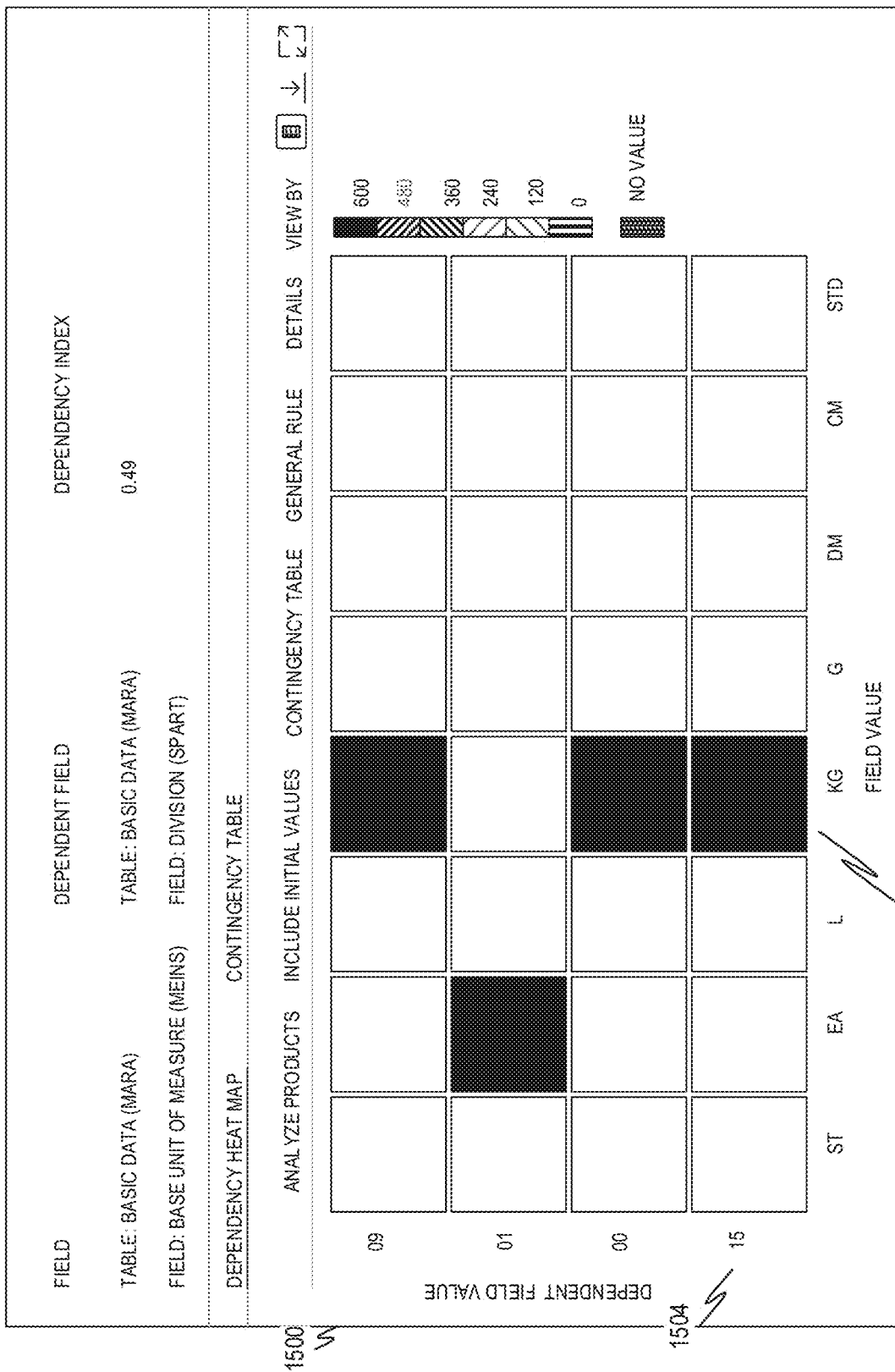
FIG. 15 is a screen capture illustrating a tenth screen of user interface, in accordance with an example embodiment.

FIG. 15 is a screen capture illustrating a tenth screen of user interface 800, in accordance with an example embodiment. Here, a heat map 1500 is provided that shows, for each field value 1502, a value for a related dependent field value 1504. The heat map may be colored/shaded so that the color/shade reflects the underlying value, which gives a clear indication of field-value-combinations.

A Master Data Record Analysis application can then provide various information about master data records. Specifically, a user may analyze products with selected field values, take a deep dive into an entity model, start mass change processes for selected products, and show a change history.

Example 1. A system comprising:
at least one hardware processor; and
a computer-readable medium storing instructions that, when executed by the at least one hardware processor, cause the at least one hardware processor to perform operations comprising:
receiving, via a graphical user interface, a selection of a data model, the data model uniquely corresponding to a domain of an enterprise resource processing (ERP) system;
retrieving one or more master data records corresponding to the selected data model;
extracting, from the one or more master data records, model information, the model information including one or more tables, the tables each having one or more fields, each field having a data type and a description, at least one of the fields in one of the tables being dependent upon a field in another of the tables;
storing the model information in an in-memory database;
using an in-memory database management system of the in-memory database, generating, from the model information, a model field table, the model field table containing a first column corresponding to table identifications, a second column corresponding to field identifications, and a third column corresponding to field types;
performing a function on the model field table in response to receiving, via the graphical user interface, a selection of a request to perform the function on the model field table; and
graphically displaying results of the function in the graphical user interface.

Example 2. The system of Example 1, wherein the model field table further includes a fourth column corresponding to data type in an Advanced Business Application Programming (ABAP) dictionary.

Example 3. The system of Examples 1 or 2, wherein the function is to calculate a distribution, and the performing a function include traversing the model field table and, for each field identification in the model field table, identifying a field value that exists in corresponding data in the in-memory database and a count for each time the field value appears in the data.

Example 4. The system of any of Examples 1-3, wherein the function is to calculate a contingency table and the performing a function includes, for one or more field identifications, identifying one or more dependent field identifications.

Example 5. The system of Example 4, further comprising calculating a dependency/correlation level using a ChiSquare algorithm.

Example 6. The system of Example 4, further comprising calculating a dependency/correlation level using a Cramers V algorithm.

Example 7. The system of any of Examples 1-6, wherein the graphically displaying includes displaying a heat map of field value combinations.

Example 8. A method comprising:
receiving, via a graphical user interface, a selection of a data model, the data model uniquely corresponding to a domain of an enterprise resource processing (ERP) system;
retrieving one or more master data records corresponding to the selected data model;
extracting, from the one or more master data records, model information, the model information including one or more tables, the tables each having one or more fields, each field having a data type and a description, at least one of the fields in one of the tables being dependent upon a field in another of the tables;
storing the model information in an in-memory database;
using an in-memory database management system of the in-memory database, generating, from the model information, a model field table, the model field table containing a first column corresponding to table identifications, a second column corresponding to field identifications, and a third column corresponding to field types;
performing a function on the model field table in response to receiving, via the graphical user interface, a selection of a request to perform the function on the model field table; and
graphically displaying results of the function in the graphical user interface.

Example 9. The method of Example 8, wherein the model field table further includes a fourth column corresponding to data type in an Advanced Business Application Programming (ABAP) dictionary.

Example 10. The method of Examples 8 or 9, wherein the function is to calculate a distribution, and the performing a function include traversing the model field table and, for each field identification in the model field table, identifying a field value that exists in corresponding data in the in-memory database and a count for each time the field value appears in the data.

Example 11. The method of any of Examples 8-10, wherein the function is to calculate a contingency table and the performing a function includes, for one or more field identifications, identifying one or more dependent field identifications.

Example 12. The method of Example 11, further comprising calculating a dependency/correlation level using a ChiSquare algorithm.

Example 13. The method of Example 11, further comprising calculating a dependency/correlation level using a Cramers V algorithm.

Example 14. The method of any of Examples 8-13, wherein the graphically displaying includes displaying a heat map of field value combinations.

Example 15. A non-transitory machine-readable medium storing instructions which, when executed by one or more processors, cause the one or more processors to perform operations comprising:

receiving, via a graphical user interface, a selection of a data model, the data model uniquely corresponding to a domain of an enterprise resource processing (ERP) system;

retrieving one or more master data records corresponding to the selected data model;

extracting, from the one or more master data records, model information, the model information including one or more tables, the tables each having one or more fields, each field having a data type and a description, at least one of the fields in one of the tables being dependent upon a field in another of the tables;

storing the model information in an in-memory database;

using an in-memory database management system of the in-memory database, generating, from the model information, a model field table, the model field table containing a first column corresponding to table identifications, a second column corresponding to field identifications, and a third column corresponding to field types;

performing a function on the model field table in response to receiving, via the graphical user interface, a selection of a request to perform the function on the model field table; and graphically displaying results of the function in the graphical user interface.

Example 16. The non-transitory machine-readable medium of Example 15, wherein the model field table further includes a fourth column corresponding to data type in an Advanced Business Application Programming (ABAP) dictionary.

Example 17. The non-transitory machine-readable medium of Examples 15-16, wherein the function is to calculate a distribution, and the performing a function include traversing the model field table and, for each field identification in the model field table, identifying a field value that exists in corresponding data in the in-memory database and a count for each time the field value appears in the data.

Example 18. The non-transitory machine-readable medium of any of Examples 15-17, wherein the function is to calculate a contingency table and the performing a function includes, for one or more field identifications, identifying one or more dependent field identifications.

Example 19. The non-transitory machine-readable medium of Example 18, further comprising calculating a dependency/correlation level using a ChiSquare algorithm.

Example 20. The non-transitory machine-readable medium of Example 18, further comprising calculating a dependency/correlation level using a Cramers V algorithm.

Figure 16:
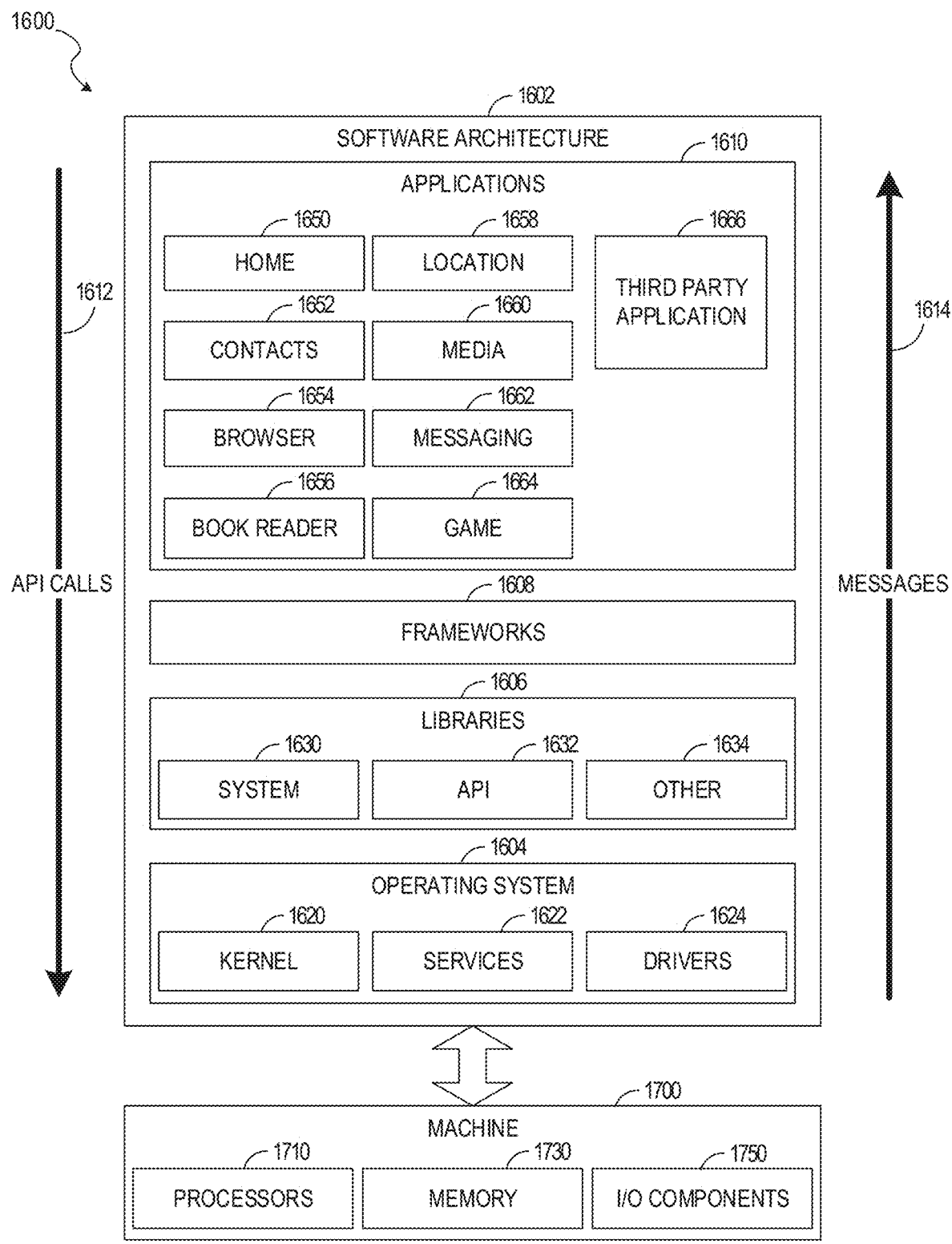
FIG. 16 is a block diagram illustrating an architecture of software, which can be installed on any one or more of the devices described above.

FIG. 16 is a block diagram 1600 illustrating a software architecture 1602, which can be installed on any one or more of the devices described above. FIG. 16 is merely a non-limiting example of a software architecture, and it will be appreciated that many other architectures can be implemented to facilitate the functionality described herein. In various embodiments, the software architecture 1602 is implemented by hardware such as a machine 1700 of FIG. 17 that includes processors 1710, memory 1730, and input/output (I/O) components 1750. In this example architecture, the software architecture 1602 can be conceptualized as a stack of layers where each layer may provide a particular functionality. For example, the software architecture 1602 includes layers such as an operating system 1604, libraries 1606, frameworks 1608, and applications 1610. Operationally, the applications 1610 invoke API calls 1612 through the software stack and receive messages 1614 in response to the API calls 1612, consistent with some embodiments.

In various implementations, the operating system 1604 manages hardware resources and provides common services. The operating system 1604 includes, for example, a kernel 1620, services 1622, and drivers 1624. The kernel 1620 acts as an abstraction layer between the hardware and the other software layers, consistent with some embodiments. For example, the kernel 1620 provides memory management, processor management (e.g., scheduling), component management, networking, and security settings, among other functionality. The services 1622 can provide other common services for the other software layers. The drivers 1624 are responsible for controlling or interfacing with the underlying hardware, according to some embodiments. For instance, the drivers 1624 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 1606 provide a low-level common infrastructure utilized by the applications 1610. The libraries 1606 can include system libraries 1630 (e.g., C standard library) that can provide functions such as memory allocation functions, string manipulation functions, mathematic functions, and the like. In addition, the libraries 1606 can include API libraries 1632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 1606 can also include a wide variety of other libraries 1634 to provide many other APIs to the applications 1610.

The frameworks 1608 provide a high-level common infrastructure that can be utilized by the applications 1610, according to some embodiments. For example, the frameworks 1608 provide various graphical user interface (GUI) functions, high-level resource management, high-level location services, and so forth. The frameworks 1608 can provide a broad spectrum of other APIs that can be utilized by the applications 1610, some of which may be specific to a particular operating system 1604 or platform.

In an example embodiment, the applications 1610 include a home application 1650, a contacts application 1652, a browser application 1654, a book reader application 1656, a location application 1658, a media application 1660, a messaging application 1662, a game application 1664, and a broad assortment of other applications, such as a third-party application 1666. According to some embodiments, the applications 1610 are programs that execute functions defined in the programs. Various programming languages can be employed to create one or more of the applications 1610, structured in a variety of manners, such as object-oriented programming languages (e.g., Objective-C, Java, or C++) or procedural programming languages (e.g., C or assembly language). In a specific example, the third-party application 1666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1666 can invoke the API calls 1612 provided by the operating system 1604 to facilitate functionality described herein.

Figure 17:
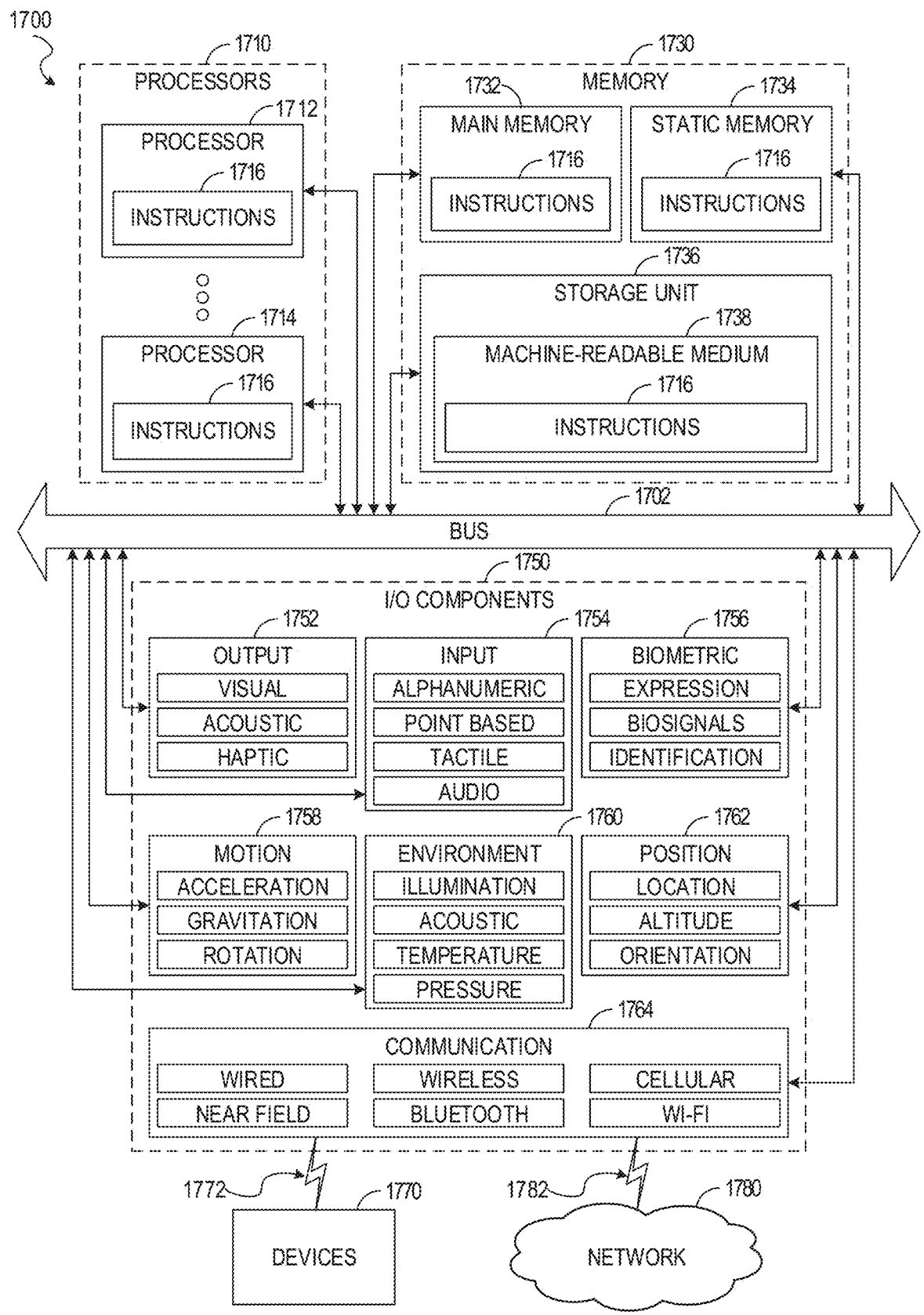
FIG. 17 illustrates a diagrammatic representation of a machine in the form of a computer system within which a set of instructions may be executed for causing the machine to perform any one or more of the methodologies discussed herein, according to an example embodiment.

FIG. 17 illustrates a diagrammatic representation of a machine 1700 in the form of a computer system within which a set of instructions may be executed for causing the machine 1700 to perform any one or more of the methodologies discussed herein, according to an example embodiment. Specifically, FIG. 17 shows a diagrammatic representation of the machine 1700 in the example form of a computer system, within which instructions 1716 (e.g., software, a program, an application, an applet, an app, or other executable code) for causing the machine 1700 to perform any one or more of the methodologies discussed herein may be executed. For example, the instructions 1716 may cause the machine 1700 to execute the methods of FIG. 9. Additionally, or alternatively, the instructions 1716 may implement FIGS. 1-16 and so forth. The instructions 1716 transform the general, non-programmed machine 1700 into a particular machine 1700 programmed to carry out the described and illustrated functions in the manner described. In alternative embodiments, the machine 1700 operates as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1716, sequentially or otherwise, that specify actions to be taken by the machine 1700. Further, while only a single machine 1700 is illustrated, the term "machine" shall also be taken to include a collection of machines 1700 that individually or jointly execute the instructions 1716 to perform any one or more of the methodologies discussed herein.

The machine 1700 may include processors 1710, memory 1730, and I/O components 1750, which may be configured to communicate with each other such as via a bus 1702. In an example embodiment, the processors 1710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1712 and a processor 1714 that may execute the instructions 1716. The term "processor" is intended to include multi-core processors that may comprise two or more independent processors (sometimes referred to as "cores") that may execute instructions 1716 contemporaneously. Although FIG. 17 shows multiple processors 1710, the machine 1700 may include a single processor 1712 with a single core, a single processor 1712 with multiple cores (e.g., a multi-core processor 1712), multiple processors 1712, 1714 with a single core, multiple processors 1712, 1714 with multiple cores, or any combination thereof.

The memory 1730 may include a main memory 1732, a static memory 1734, and a storage unit 1736, each accessible to the processors 1710 such as via the bus 1702. The main memory 1732, the static memory 1734, and the storage unit 1736 store the instructions 1716 embodying any one or more of the methodologies or functions described herein. The instructions 1716 may also reside, completely or partially, within the main memory 1732, within the static memory 1734, within the storage unit 1736, within at least one of the processors 1710 (e.g., within the processor's cache memory), or any suitable combination thereof, during execution thereof by the machine 1700.

The I/O components 1750 may include a wide variety of components to receive input, provide output, produce output, transmit information, exchange information, capture measurements, and so on. The specific I/O components 1750 that are included in a particular machine will depend on the type of machine. For example, portable machines such as mobile phones will likely include a touch input device or other such input mechanisms, while a headless server machine will likely not include such a touch input device. It will be appreciated that the I/O components 1750 may include many other components that are not shown in FIG. 17. The I/O components 1750 are grouped according to functionality merely for simplifying the following discussion, and the grouping is in no way limiting. In various example embodiments, the I/O components 1750 may include output components 1752 and input components 1754. The output components 1752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1750 may include biometric components 1756, motion components 1758, environmental components 1760, or position components 1762, among a wide array of other components. For example, the biometric components 1756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1758 may include acceleration sensor components (e.g., accelerometer), gravitation sensor components, rotation sensor components (e.g., gyroscope), and so forth. The environmental components 1760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1750 may include communication components 1764 operable to couple the machine 1700 to a network 1780 or devices 1770 via a coupling 1782 and a coupling 1772, respectively. For example, the communication components 1764 may include a network interface component or another suitable device to interface with the network 1780. In further examples, the communication components 1764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1770 may be another machine or any of a wide variety of peripheral devices (e.g., coupled via a USB).

Moreover, the communication components 1764 may detect identifiers or include components operable to detect identifiers. For example, the communication components 1764 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1764, such as location via Internet Protocol (IP) geolocation, location via Wi-Fi® signal triangulation, location via detecting an NFC beacon signal that may indicate a particular location, and so forth.

The various memories (i.e., 1730, 1732, 1734, and/or memory of the processor(s) 1710) and/or the storage unit 1736 may store one or more sets of instructions 1716 and data structures (e.g., software) embodying or utilized by any one or more of the methodologies or functions described herein. These instructions (e.g., the instructions 1716), when executed by the processor(s) 1710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1780 or a portion of the network 1780 may include a wireless or cellular network, and the coupling 1782 may be a Code Division Multiple Access (CDMA) connection, a Global System for Mobile communications (GSM) connection, or another type of cellular or wireless coupling. In this example, the coupling 1782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1716 may be transmitted or received over the network 1780 using a transmission medium via a network interface device (e.g., a network interface component included in the communication components 1764) and utilizing any one of a number of well-known transfer protocols (e.g., Hypertext Transfer Protocol (HTTP)). Similarly, the instructions 1716 may be transmitted or received using a transmission medium via the coupling 1772 (e.g., a peer-to-peer coupling) to the devices 1770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1716 for execution by the machine 1700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving, via a graphical user interface, a selection of a data model, the data model uniquely corresponding to a domain of an enterprise resource processing (ERP) system;
   retrieving one or more master data records corresponding to the selected data model;
   extracting, from the one or more master data records, model information, the model information including one or more tables, the tables each having one or more fields, each field having a data type and a description, at least one of the fields in one of the tables being dependent upon a field in another of the tables;
   storing the model information in an in-memory database;
   using an in-memory database management system of the in-memory database, generating, from the model information, a model field table, the model field table containing a first column corresponding to table identifications, a second column corresponding to field identifications, and a third column corresponding to field types;
   performing a function on the model field table in response to receiving, via the graphical user interface, a selection of a request to perform the function on the model field table; and
   graphically displaying results of the function in the graphical user interface.

2. The system of claim 1, wherein the model field table further includes a fourth column corresponding to data type in an Advanced Business Application Programming (ABAP) dictionary.

3. The system of claim 1, wherein the function is to calculate a distribution, and the performing a function include traversing the model field table and, for each field identification in the model field table, identifying a field value that exists in corresponding data in the in-memory database and a count for each time the field value appears in the data.

4. The system of claim 1, wherein the function is to calculate a contingency table and the performing a function includes, for one or more field identifications, identifying one or more dependent field identifications.

5. The system of claim 4, further comprising calculating a dependency/correlation level using a ChiSquare algorithm.

6. The system of claim 4, further comprising calculating a dependency/correlation level using a Cramers V algorithm.

7. The system of claim 1, wherein the graphically displaying includes displaying a heat map of field value combinations.

8. A method comprising:
   receiving, via a graphical user interface, a selection of a data model, the data model uniquely corresponding to a domain of an enterprise resource processing (ERP) system;
   retrieving one or more master data records corresponding to the selected data model;
   extracting, from the one or more master data records, model information, the model information including one or more tables, the tables each having one or more fields, each field having a data type and a description, at least one of the fields in one of the tables being dependent upon a field in another of the tables;
   storing the model information in an in-memory database;
   using an in-memory database management system of the in-memory database, generating, from the model information, a model field table, the model field table containing a first column corresponding to table identifications, a second column corresponding to field identifications, and a third column corresponding to field types;
   performing a function on the model field table in response to receiving, via the graphical user interface, a selection of a request to perform the function on the model field table; and
   graphically displaying results of the function in the graphical user interface.

9. The method of claim 8, wherein the model field table further includes a fourth column corresponding to data type in an Advanced Business Application Programming (ABAP) dictionary.

10. The method of claim 8, wherein the function is to calculate a distribution, and the performing a function include traversing the model field table and, for each field identification in the model field table, identifying a field value that exists in corresponding data in the in-memory database and a count for each time the field value appears in the data.

11. The method of claim 8, wherein the function is to calculate a contingency table and the performing a function includes, for one or more field identifications, identifying one or more dependent field identifications.

12. The method of claim 11, further comprising calculating a dependency/correlation level using a ChiSquare algorithm.

13. The method of claim 11, further comprising calculating a dependency/correlation level using a Cramers V algorithm.

14. The method of claim 8, wherein the graphically displaying includes displaying a heat map of field value combinations.

15. A non-transitory machine-readable medium storing instructions which, when executed by one or more processors, cause the one or more processors to perform operations comprising:
- receiving, via a graphical user interface, a selection of a data model, the data model uniquely corresponding to a domain of an enterprise resource processing (ERP) system;
- retrieving one or more master data records corresponding to the selected data model;
- extracting, from the one or more master data records, model information, the model information including one or more tables, the tables each having one or more fields, each field having a data type and a description, at least one of the fields in one of the tables being dependent upon a field in another of the tables;
- storing the model information in an in-memory database;
- using an in-memory database management system of the in-memory database, generating, from the model information, a model field table, the model field table containing a first column corresponding to table identifications, a second column corresponding to field identifications, and a third column corresponding to field types;
- performing a function on the model field table in response to receiving, via the graphical user interface, a selection of a request to perform the function on the model field table; and
- graphically displaying results of the function in the graphical user interface.

16. The non-transitory machine-readable medium of claim 15, wherein the model field table further includes a fourth column corresponding to data type in an Advanced Business Application Programming (ABAP) dictionary.

17. The non-transitory machine-readable medium of claim 15, wherein the function is to calculate a distribution, and the performing a function include traversing the model field table and, for each field identification in the model field table, identifying a field value that exists in corresponding data in the in-memory database and a count for each time the field value appears in the data.

18. The non-transitory machine-readable medium of claim 15, wherein the function is to calculate a contingency table and the performing a function includes, for one or more field identifications, identifying one or more dependent field identifications.

19. The non-transitory machine-readable medium of claim 18, further comprising calculating a dependency/correlation level using a ChiSquare algorithm.

20. The non-transitory machine-readable medium of claim 18, further comprising calculating a dependency/correlation level using a Cramers V algorithm.

* * * * *